(No Model.)
L. T. WEISS.
SPEED INDICATOR.
No. 486,651. Patented Nov. 22, 1892.
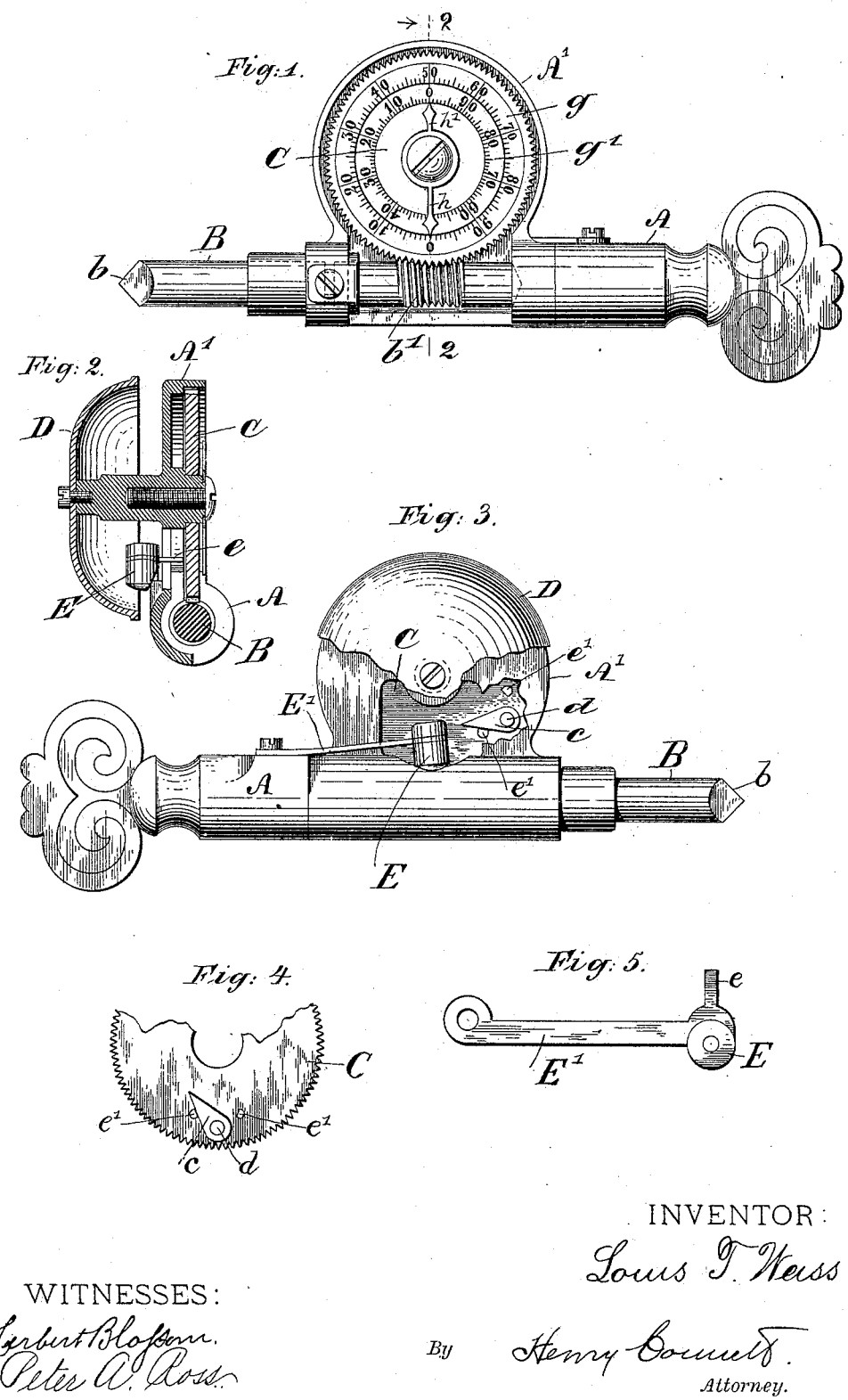
WITNESSES:
Herbert Blossom.
Peter A. Ross.
INVENTOR:
Louis T. Weiss
By Henry Connett.
Attorney.

UNITED STATES PATENT OFFICE.

LOUIS T. WEISS, OF BROOKLYN, NEW YORK.

SPEED-INDICATOR.

SPECIFICATION forming part of Letters Patent No. 486,651, dated November 22, 1892.

Application filed January 18, 1892. Serial No. 418,490. (No model.)

*To all whom it may concern:*

Be it known that I, LOUIS T. WEISS, a citizen of the United States, and a resident of Brooklyn, Kings county, New York, have invented certain Improvements in Speed-Indicators, of which the following is a specification.

My invention relates to the class of speed-indicators for ascertaining the speed of shafting wherein the number of rotations of the spindle is indicated both to the sight and to some other sense—as that of the hearing, for example.

My improvements relate in part to the means for indicating the number of rotations by sound and in part to the means for indicating the number of rotations in whichever direction the shaft may be rotating.

The invention will be fully described hereinafter, and its novel features carefully defined in the claim.

In the accompanying drawings, which serve to illustrate my invention, Figure 1 is a front elevation of a speed-indicator embodying my improvements. Fig. 2 is a transverse section of the same in the plane indicated by the line 2 2 in Fig. 1. Fig. 3 is a rear elevation with a part of the gong and a part of the casing broken away. Fig. 4 is a part of the worm-wheel as seen from the back or rear, and Fig. 5 is a plan view of the gong-hammer detached.

A represents the handle or frame of the instrument by which the operator grasps it.

B is the spindle rotatively mounted in said handle and provided with a pyramidal tip or point $b$ and a screw-thread or worm $b'$.

C is a worm-wheel mounted rotatively in a casing A' on the handle, its teeth being in gear with the worm or screw on the spindle B. On the face of the worm-wheel are numbered graduations, and on the casing or non-moving part of the instrument is a pointer or index-hand.

All of the above-described features are common in this class of instruments.

In order that the operator may know when the worm-wheel C has completed a rotation, I provide the instrument with an annunciator, which appeals to some other sense than that of sight, as to the sense of touch or the sense of hearing, so that, with his eye fixed constantly upon his watch noting the time, he may be apprised of the number of rotations made by the wheel C through another sense, and thus be able to note exactly the length of time required for the wheel C to make one rotation or several consecutive rotations. I prefer to employ a gong as a rotation-annunciator, means being provided whereby said gong is sounded at each rotation of the wheel C.

In the drawings, D represents the gong, mounted on a stud on the casing A', and E is a hammer mounted on the end of a spring-hammer arm E', fixed at one end to the handle A. On the hammer E or its arm is a laterally-projecting stud $e$, which stands in the path of a cam-piece $c$ on the back of the wheel C, whereby at each revolution of said wheel the cam-piece $c$ takes under the stud $e$ and raises or draws back the hammer. When the cam passes the stud, the hammer is freed and strikes the gong a smart blow. As herein shown, the wheel C has one hundred teeth and turns once around when the spindle makes one hundred revolutions, and the gong is sounded once at each rotation of the wheel C. It will be obvious, however, that these conditions may be departed from. The wheel might, for example, have two hundred teeth and it might be provided with two oppositely-arranged cam-pieces $c$, so as to sound the gong twice at each rotation. It is only essential that the gong or other annunciator shall be sounded or actuated when the spindle B shall have made a known number of rotations. In order that the cam-piece $c$ may actuate the hammer properly in whatever direction the spindle B may be rotating, I make said cam-piece of a wedge form and mount it pivotally on the wheel C by a stud $d$ between two stop-pins or projections $e'$ on the wheel.

The instrument as described may be used as follows: The operator grasps the handle of the instrument and presses the point $b$ of the spindle in the indentation in the rotating shaft, fixing his eye at the same time on the seconds-hand of his watch. At the instant the gong sounds he notes the time, and still keeping his eye fixed on the watch he awaits the second sounding of the gong, noting the time again. He now knows exactly the time in which the wheel C has made a complete rotation, equivalent in this case to one hundred rotations of the shaft. He may, for greater accuracy, note the time required for the wheel C to make two or more consecutive revolutions. On the face of the wheel C (see Fig. 1) are two series of graduations $g$ and $g'$, arranged in concentric circles and numbered in opposite directions, and fixed to the stud of the casing about which the wheel C turns are two pointers $h$ and $h'$ to indicate the numbered graduations in the respective series. The object of these two series of graduations is to enable the instrument to be conveniently used in whichever way the spindle B may be rotating. It will be obvious that the instrument may be used to determine the number of rotations of the shaft in the opposite manner from that specified—that is, the operator may apply the instrument to the shaft for, say, exactly one minute and by noting the position of the pointer with respect to the numbered graduations at the beginning and end of the minute and noting, also, the complete rotations of the wheel C as announced by the gong he can ascertain how many rotations the shaft makes per minute. I prefer in most cases a rotation-annunciator which conveys its indications by sound to the sense of hearing; but, as in some cases, the noise will be such as to render this announcement uncertain the indication may be through the sense of touch—that is, the operator may place his finger in position to receive the blow of the hammer, or if the instrument has a gong he may place his finger on the gong. Indeed, with a rotation-annunciator in the nature of a spring-hammer, as herein shown, the shock produced by the blow of the hammer will be felt whether the hammer actually strikes a gong or the operator's finger.

I do not herein claim, broadly, the use of a gong or annunciator for indicating to the sense of hearing the number of rotations of a hand or index or a spindle or arbor, as such applications of a gong or bell are well known in many constructions. In my speed-indicator the hammer which strikes the gong is mounted on the stationary handle, and the cam-piece which operates it is carried around by the worm-wheel on which it is mounted.

Having thus described my invention, I claim—

A speed-indicator comprising a handle, a spindle rotatively mounted therein and having on it a worm, a worm-wheel mounted rotatively on the handle and in gear with the worm, a pivoted cam-piece mounted on the worm-wheel between limiting-studs, a spring-hammer mounted on the handle and adapted to be actuated by said cam-piece in whichever direction the worm-wheel is rotated, and a gong mounted on the handle in position to be struck by the hammer.

In witness whereof I have hereunto signed my name in the presence of two subscribing witnesses.

LOUIS T. WEISS.

Witnesses:
HENRY CONNETT,
HERBERT BLOSSOM.